Jan. 5, 1954     O. H. SCHUCK     2,665,416
APPARATUS FOR DETERMINING THE DIRECTION OF WAVE ENERGY
Filed Aug. 15, 1944
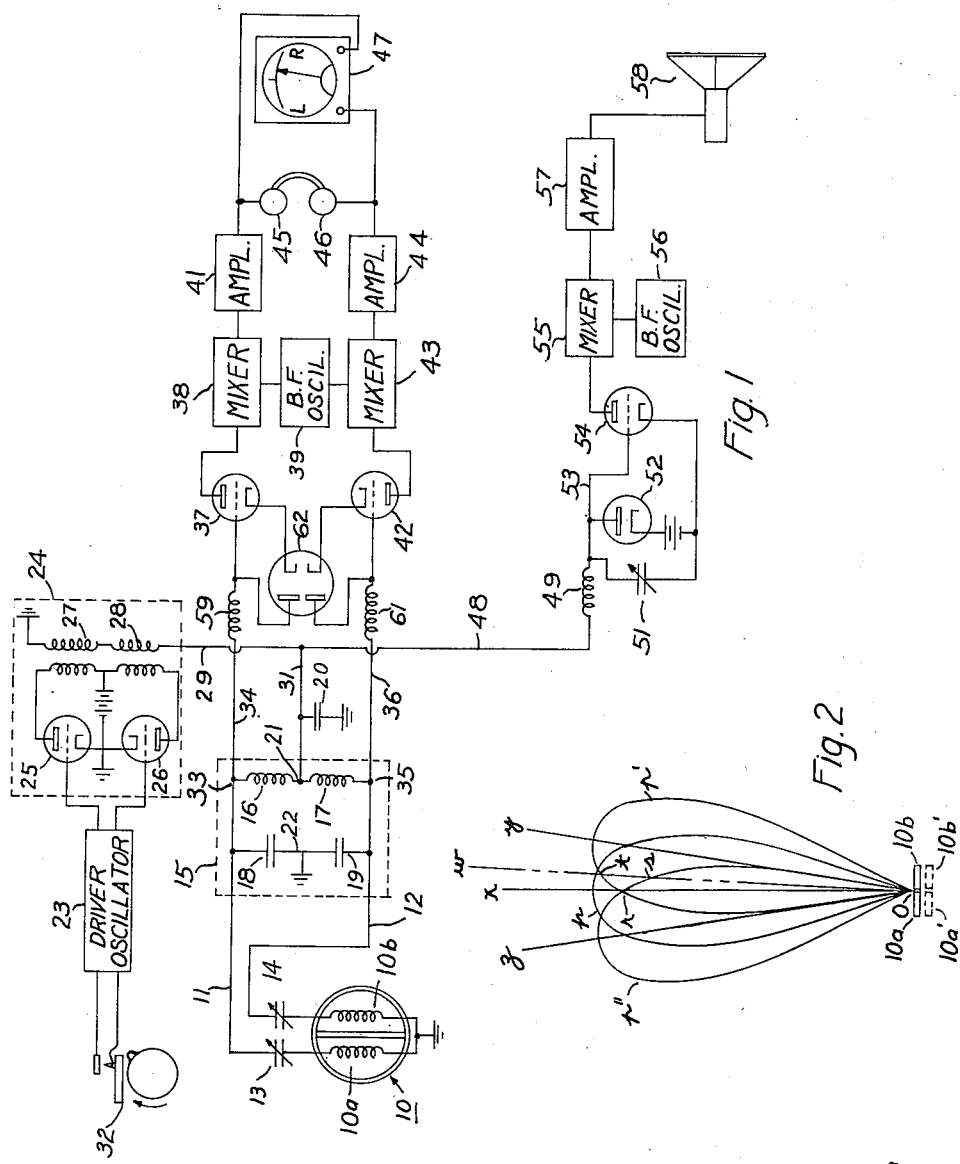
Inventor
OSCAR H. SCHUCK
By W. Glenn Jones
Attorney Patented Jan. 5, 1954

2,665,416

UNITED STATES PATENT OFFICE 2,665,416

APPARATUS FOR DETERMINING THE DIRECTION OF WAVE ENERGY

Oscar Hugo Schuck, Belmont, Mass.

Application August 15, 1944, Serial No. 549,523

13 Claims. (Cl. 340—6)

This invention relates to apparatus for determining the direction of origin of wave energy and is particularly directed, although not limited to the determination of the direction of a source of compressional wave energy.

The invention is of especial utility in underwater sound echo ranging and is described in this connection in the following specification. However, it should be expressly understood that it is equally applicable in conjunction with other forms of echo ranging or sonic listening apparatus.

In my previously filed application, Serial No. 531,490, filed April 17, 1944, now Patent No. 2,524,180, apparatus is there disclosed for determining the direction of origin of wave energy by simultaneously establishing, electrically, a plurality of overlapped directional lobes of sensitivity in an array of wave receiving elements in which each of the lobes is determined by the combined response of more than one element of the array. By the use of a phase shifting device connected in circuit with each element of the array such as elements A and B, for example, one directional lobe is derived by combining a direct output from element A with a phase shifted output from element B to form a first receiver output channel; the other directional lobe is derived by combining a direct output from element B with a phase shifted output from element A to form a second receiver output channel. By comparing the amplitudes of the received energy in the two receiver output channels, either visually or aurally, an operator is thus accurately informed of the true bearing of the source of the energy with respect to the perpendicular to the array of the receiver elements.

The invention in the aforesaid application was illustrated as applied to an echo ranging and bearing system which comprised a transducer of either the magnetostriction or piezoelectric type with the transducer elements divided vertically into two halves. A driver-oscillator was utilized to drive the transducer to send out pulses of compressional wave energy and a dual channel receiver was used to pick up the returning echos of these pulses. By means of a relay arrangement, contact operation of which was controlled through a timer, the driver oscillator was connected for a brief period to drive all of the elements in both halves of the transducer simultaneously and in phase to send out the wave energy pulse. The relay contacts then operated to disconnect the oscillator from the transducer and to connect each half of the transducer to its respective input channel of the receiver unit to thereby ready the apparatus for receiving any echo of the transmitted pulses. This cycle was then repeated at a rate determined by the frequency of the relay operation, energization of which was controlled through the timer.

Besides the echo ranging and bearing apparatus referred to, in which the driver-oscillator and receiver are alternately connected to the transducer through a relay, there is another class of apparatus in which the relay is omitted, both the driver-oscillator and receiver being connected to the transducer at all times. The object of this invention is to provide a novel circuit arrangement by which the broad principles of simultaneous lobe comparison described and claimed in my aforesaid application may be applied to echo ranging and bearing systems of the latter type.

A more specific object is to provide an echo ranging and bearing system comprising a transducer having its wave energy responsive elements split into two halves to thereby form two output channels. Connected across these two output channels is a phase shifting device, which is a lag line in the embodiment hereinafter described, and which is tapped at its midpoint. The output of a driver oscillator, intermittently operated through a timer, is permanently connected to the midpoint on the lag line and the respective inputs of a dual channel comparison receiver unit are connected to each end of the lag line. Thus each time the drive oscillator is operated, its output feeds into the midpoint of the lag line and thence through each half of the lag line to the respective halves of the transducer. Since both halves of the lag line have identical electrical characteristics, the same amount of input delay is imparted to both halves of the transducer with the result that the elements in both halves of the transducer are energized simultaneously and in phase in the same manner as they would be were the output of the driver oscillator connected directly to them and the lag line omitted from the circuit. When the echo of the pulse returns, the lag line functions to produce at one of the input channels of the receiver, a signal which corresponds to a shift in the axis of maximum sensitivity of the transducer to one side of the perpendicular thereto, and to produce at the other input channel of the receiver a signal corresponding to a shift in the axis of the maximum sensitivity of the transducer to the other side of the perpendicular to the transducer, the two shifted sensitivity patterns being overlapped.

the amplitudes of the signals in the two input channels of the receiver are then compared either visually or aurally to thus give an indication as to the direction of the source of the echo with respect to the perpendicular to the active face of the transducer.

If it is also desired to so utilize both halves of the transducer for receiving so that the transducer will have maximum sensitivity in a direction perpendicular to its active face, a separate receiver unit having but a single channel input may be connected to the midpoint of the lag line. With such a connection, the single channel receiver unit derives an input with equal amounts of phase shift through both halves of the lag line to give the same result as would be obtained were the two outputs from both halves of the transducer connected in parallel directly to the receiver input instead of through the lag line.

Other objects of the invention will become more apparent from the following specification, read in connection with the accompanying drawings in which:

Fig. 1 is a diagram illustrating one form of the invention with the wave energy responsive device divided into two vertical sections; and Fig. 2 is a representation of the two shifted directional sensitivity lobes and the unshifted lobe produced by the arrangement shown in Fig. 1.

Referring now to Fig. 1, the invention includes an underwater transducer 10 which contains a plurality of magnetostriction elements. All the elements in the left half 10a of the transducer are connected together and feed into a first output channel 11. All the elements in the right transducer half 10b are similarly connected and feed into a second output channel 12. Variable capacitors 13, 14, are interposed in each of the channels 11 and 12, respectively.

Connected directly across channels 11 and 12 and included within the broken line block 15 is a phase shifting device consisting of two inductance coils 16, 17 and three capacitors 18, 19 and 20. The mid shunt characteristic impedance of the phase shifting device taken across points 21 and 22 is made equal to R/2, where R is the impedance looking into the elements of transducer 10, such elements having first been tuned for zero power factor by means of the series connected capacitors 13 and 14. The impedance is thus that which would result were the elements in the two halves of the transducer 10 parallel without the lag line.

A driver oscillator 23 having an output frequency in the supersonic range, such as, for example, 20 kc., has an output stage (within broken line block 24) comprising triodes 25, 26 operating as a class B amplifier for purposes which will be hereinafter explained. Through coupling transformers 27 and 28, the output from oscillator 23 feeds over conductors 29 and 31 to the midtap point 21 on the lag line and is permanently connected at this point. The desired intermittent operation of oscillator 23 is obtained by means of a timer-contactor device 32 with the result that spaced energy pulses are sent out by the transducer halves 10a and 10b. As previously explained, since the oscillator output passes through identical sections of the lag line, the effect is the same as though the oscillator output were connected directly to the transducer halves 10a and 10b instead of indirectly thereto through the lag line. With this arrangement, the magnetostriction elements comprising the transducer halves 10a and 10b are all energized simultaneously and in phase with the result that pulses of wave energy are emitted from the transducer with a maximum intensity along the perpendicular with a maximum intensity along the perpendicular Ox to the active face of the transducer 10. The pattern is represented at p in Fig. 2.

When an echo of a transmitted pulse returns to the transducer from a submarine target, the resulting mechanical vibration of the transducer's magnetostriction elements generate electromotive forces therein. The voltages generated in transducer half 10a are combined by means of electrical connections within the body of the transducer and cause signal currents corresponding thereto to flow into output channel 11 through capacitor 13.

In a similar manner, the voltages generated in transducer half 10b are combined and signal currents corresponding to these voltages flow into output channel 12 through capacitor 14.

At point 33 on channel 11, the signal currents coming directly from transducer half 10a combine with the signal currents coming from transducer half 10b, the latter currents, however, being first shifted in phase since they must pass through lag line inductances 17 and 16 in order to reach point 33.

The electrical effect of these combined currents in conductor 34 corresponds to, or is equivalent to, a shift in the direction sensitivity pattern when receiving away from the axis Ox normal to the face of the transducer 10 to axis Oy as shown in Fig. 2, such pattern being designated by p' and representing a right shifted directivity of the array of transducer elements.

To state this result in another manner, the phase delay imparted to the signal currents from transducer half 10b in output channel 12 when passed through the phase shifter 15 has the same effect as though the elements in transducer half 10b were set back to position 10b' shown in Fig. 2. Thus when the output from transducer half 10b is combined with the output from transducer half 10a which remains unshifted in phase, the combined response is the same as though the face of the transducer were to be turned so that the perpendicular thereto is along axis Oy, and the outputs from transducer halves 10a and 10b combined directly without utilizing a phase shifter.

At point 35 on channel 12, the signal currents coming directly from transducer half 10b combine with the signal currents coming from transducer half 10a, the latter being shifted in phase since these must now pass through phase shifter 15 in order to reach point 35. The electrical effect of this in conductor 36 is the same as though transducer half 10a were to be set back to position 10a' shown in Fig. 2 with the result that the overall direction sensitivity pattern of the complete transducer 10 is shifted away from the axis Ox to axis Oz, the sensitivity pattern now being designated by p'' and representating a left shifted directivity of the transducer array.

The combined signal currents in conductor 34 then pass through an amplifier stage 37 and then into a mixer 38 where they are beat with the output from a beat frequency oscillator 39 to produce a difference frequency output in the audio range. These audio currents are then amplified in audio amplifier 41.

In a similar manner, the combined signal currents in conductor 36 feed into amplifier 42 and then into mixer 43 where they are also beat with the output from beat frequency oscillator 39 to produce corresponding audio frequency signals which then may be amplified in audio amplifier 44.

The combined signal currents which appear at the outputs of amplifier stages 41 and 44 respectively will vary depending on the direction of the echo pulse relative to the mid-plane of the transducer face. If the echo pulse returns to the face of the transducer along axis $Ox$, it is seen from the patterns in Fig. 2 that the amplitude of the echo pulses in both signals will be equal, being represented by the vector $Or$. However, if the echo pulse returns along some other axis such as $Ow$, its amplitude in the left shifted output channel represented by lobe $p''$ will be at a level indicated by vector $Os$ while its amplitude in the right output channel represented by lobe $p'$ will be at a level indicated by vector $Ot$. The comparison of relative amplitudes of the outputs in the two channels indicates whether the echo pulse is returning to the transducer face from the left or from the right of the perpendicular thereto, or along the perpendicular. Of course, in actual operation, an operator would endeavor so to train the transducer 10 that the signal amplitudes in both of the channels are always aqual, in which event, the bearing of the target which initiates the pulse echo is along the axis $Ox$, normal to the face of the transducer. The comparison of the outputs in the two channels representing the two directivities of the transducer elements may be made binaurally in receivers 45, 46, or visually by a left-right indicator 47 which is of conventional design and hence has been illustrated only diagrammatically.

When the apparatus is used for listening to underwater sounds set up directly by a target as distinguished from emitting sounds and receiving their echoes from the target, it is advantageous to utilize a single channel receiver, the input to which is supplied from both halves of the transducer without any relative phase shift therebetween. To do this, a permanent connection may be made to conductor 31 which connects with the mid point of lag line inductances 16 and 17.

Since this connection is made at the midpoint on the lag line, the outputs from both halves of the transducer 10 receive the same amount of phase shift, the result being the same as though the lag line were to be omitted entirely and the transducer outputs combined directly. Consequently, the direction sensitivity pattern has its maximum along axis $Ox$, the pattern being indicated at $p$ in Fig. 2. The input is taken via conductor 48 through inductance 49 and capacitor 51. Across capacitor 51 is a biased diode 52 which conducts only on high voltages. This conduction effectively short circuits the receiver input for high input voltages and produces an input impedance which is essentially that of the inductor and, therefore, high. By this arrangement, when the driver oscillator 23 is operating, almost the entire energy therefrom goes into the transducer halves 10a and 10b, with very little being lost in the single channel receiver which is fed via conductor 48.

Conversely, since the output 24 of oscillator 23 is operated class B it presents a high impedance compared with the input impedance of the single channel receiver and hence most of the output energy coming from transducer havles 10a and 10b, when receiving goes into the single channel receiver with very little being lost in the driver oscillator portion of the circuit.

The input to the single channel reseiver unit passes via conductor 53 to amplifier stage 54, the output of the latter being fed to mixer 55 where it is beat with the output from beat frequency oscillator 56 to produce a difference frequency audio output. This latter output may then be passed through an amplifier stage 57 and thence to a loud speaker 58.

With use of the twin channel comparison receiver above described, it is advisable to keep as much as possible of the output from driver oscillator 23 out of the receiver circuit. This may be done by means similar to those used for this purpose in the single channel reeciver. That is, inductances 59, 61, are inserted in lines 34 and 36, respectively, and double diode 62 connected as shown, one anode and cathode being connected between the input grid and cathode of amplifier 37 and the other anode and cathode being similarly connected to amplifier 42.

The double diode 62 becomes conductive only on high voltages, and therefore has no effect on the operation of the two-channel receiver during the interval of time between successive operations of the driver oscillator 23. However, when the driver oscillator 23 is actuated by the timer 32, the voltage across the double diode 62 is raised to a point at which the elements of the double diode 62 becomes conductive, and effectively short-circuit the two input circuits of the two-channel receiver. The inductances 59 and 61 are included in the respective series circuits to present high impedances to the oscillator power from the driver oscillator 23, and thus to prevent the loss of any considerable driving power through the diode 62 during transmission of sound energy from the transducer 10.

In conclusion, it should be expressly understood that the foregoing description concerns but the preferred embodiment of my invention and that various changes may be made therein without departing from the spirit and scope of the invention as defined in the appended claims.

For example, the phase shifter connected across the two sections of the transducer unit has been described as a lag line which acts to retard the phase of the electrical quantities presented thereto. However, since it is only necessary to produce a relative shift in phase between the outputs of the two transducer sections, it is evident that a lead line to advance the phase of the electrical quantities produced in the transducer may be adapted as well as combinations of lead and lag lines.

Further, while it is preferred to use a single transducer structure in which the elements are divided into sections, it is evident that substantially the same benefits may be derived by the use of separate transducers placed close enough so that the overlapping directivity patterns may be created.

As used herein, the term "transducer" is intended to include any device capable of translating wave energy, either acoustic or radiant, to electrical energy and vice versa.

What is claimed is:

1. Apparatus for use in determining the direction of a source of wave energy comprising, a plurality of members constituting a two-section array capable of translating wave energy into electrical energy, a phase shifter permanently connected across said members to produce in combination with said two-section array two sensitivity lobes displaced equal amounts in opposite directions from the perpendicular axis of said ray, a two-channel receiver connected across said phase shifter for simultaneous reception of wave energy in respective ones of said sensitivity lobes, and a single channel receiver, the input to which is connected at the mid-point on said phase shifter.

2. Echo ranging and bearing apparatus comprising a plurality of members constituting an array capable of translating wave energy into electrical energy and vice versa, a phase shifter connected across said members, a driver-oscillator, the output of which is connected to the mid-point on said phase shifter, and a receiver the input for which is taken at a selected point along said phase shifter.

3. The combination in claim 2 wherein said receiver input is taken at the mid-point of said phase shifter.

4. The combination in claim 2 wherein said receiver comprises twin input channels, one of said channels being connected to one end of said phase shifter, the other channel being connected to the other end of said phase shifter, and further including means for comparing the outputs in the said twin channels.

5. Apparatus for use in determining the direction of a source of acoustic wave energy comprising, first and second transducers disposed closely adjacent each other and having their active faces coplanar, the directivity pattern of said transducers when combined directly having a major lobe the axis of which is perpendicular to the transducer faces, a phase shifter permanently connected across the respective outputs from said transducers to produce in combination with said transducers two sensitivity lobes equi-angularly displaced for the perpendicular axis of said transducers in opposite directions, a two-channel receiver connected across said phase shifter for simultaneous reception of wave energy from the two sensitivity lobes of said transducer, and a single channel receiver, the input to which is connected at the mid-point on said phase shifter.

6. The combination in claim 5 wherein said first and second transducers are constituted by a single transducer unit, the elements of which are divided into halves of like characteristics.

7. Acoustic wave energy echo ranging and bearing apparatus comprising first and second transducers disposed closely adjacent each other and having their active faces coplanar, the directivity pattern of said transducers when combined directly having a major lobe, the axis of which is perpendicular to the transducer faces, a phase shifter connected across the respective output circuits from said transducers, a driver-oscillator, the output of which is connected to the mid-point on said phase shifter, and a receiver, the input for which is taken at a selected point along said phase shifter.

8. The combination in claim 7 wherein said receiver input is taken at the mid-point on said phase shifter.

9. The combination in claim 7 wherein said first and second transducers are constituted by a single transducer unit, the elements of which are divided into halves of like characteristics, and said receiver input is taken at the mid-point on said phase shifter.

10. Acoustic wave energy echo ranging and bearing apparatus comprising first and second transducers disposed closely adjacent each other and having their active faces coplanar, the directivity pattern of said transducers when combined directly having a major lobe, the axis of which is perpendicular to the transducer faces, a phase shifter connected across the respective output circuits from said transducers, a driver-oscillator, the output of which is connected to the mid-point on said phase shifter, a receiver having twin input channels, one of said channels being connected to one end of said phase shifter, the other channel being connected to the other end of said phase shifter, and means for comparing the outputs in the said twin receiver channels.

11. The combination in claim 10 wherein said first and second transducers are constituted by a single transducer unit, the elements of which are divided into halves of like characteristics.

12. Acoustic wave energy echo ranging and bearing apparatus comprising first and second transducers disposed closely adjacent each other and having their active faces coplanar, the directivity pattern of said transducers when combined directly having a major lobe, the axis of which is perpendicular to the transducer faces, a phase shifter connected across the respective output circuits from said transducers, a driver-oscillator, the output of which is connected to the mid-point on said phase shifter, receiving means connected to the mid-point and to the ends of said phase shifter, and means including a biased diode to protect said receiving means during transmission.

13. Acoustic wave energy echo ranging and bearing apparatus comprising first and second transducers disposed closely adjacent each other and having their active faces coplanar, the directivity pattern of said transducers when combined directly, having a major lobe, the axis of which is perpendicular to the transducer faces, a phase shifter connected across the respective output circuits from said transducers, a driver-oscillator, the output of which is connected to the mid-point on said phase shifter, receiving means connected to the mid-point and ends of said phase shifter, and means to protect said receiving means during transmission.

OSCAR HUGO SCHUCK.

References Cited in the file of this patent

UNITED STATES PATENTS

| Number | Name | Date |
|---|---|---|
| 2,051,032 | Eddy | Aug. 18, 1936 |
| 2,069,208 | Batchelder | Feb. 2, 1937 |
| 2,166,991 | Guanella | July 25, 1939 |
| 2,201,943 | Dallin | May 21, 1940 |
| 2,227,050 | White et al. | Dec. 31, 1940 |
| 2,251,708 | Hefele | Aug. 5, 1941 |
| 2,433,991 | Hebb | Jan. 6, 1948 |

FOREIGN PATENTS

| Number | Country | Date |
|---|---|---|
| 305,585 | Great Britain | May 6, 1930 |